United States Patent
Hoyt et al.

(10) Patent No.: US 11,555,115 B2
(45) Date of Patent: Jan. 17, 2023

(54) BIODERIVED MONOMERS AS REPLACEMENTS IN PETROLEUM BASED POLYMERS AND COPOLYMERS

(71) Applicant: Alliance for Sustainable Energy, LLC, Golden, CO (US)

(72) Inventors: Caroline Bradshaw Hoyt, Denver, CO (US); Nicholas Rorrer, Golden, CO (US); Gregg Tyler Beckham, Golden, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 417 days.

(21) Appl. No.: 16/790,093

(22) Filed: Feb. 13, 2020

(65) Prior Publication Data

US 2020/0263033 A1 Aug. 20, 2020

Related U.S. Application Data

(60) Provisional application No. 62/805,494, filed on Feb. 14, 2019.

(51) Int. Cl.
| | | |
|---|---|---|
| C08L 77/00 | (2006.01) | |
| C08G 69/26 | (2006.01) | |
| C08L 77/10 | (2006.01) | |
| C08G 69/32 | (2006.01) | |
| C08L 67/00 | (2006.01) | |
| C08L 81/04 | (2006.01) | |
| C08L 85/02 | (2006.01) | |
| C08L 73/00 | (2006.01) | |
| C08G 63/183 | (2006.01) | |
| C08L 67/02 | (2006.01) | |
| C08G 63/20 | (2006.01) | |

(52) U.S. Cl.
CPC ............ *C08L 77/00* (2013.01); *C08G 63/183* (2013.01); *C08G 63/20* (2013.01); *C08G 69/265* (2013.01); *C08G 69/32* (2013.01); *C08L 67/00* (2013.01); *C08L 67/02* (2013.01); *C08L 73/00* (2013.01); *C08L 77/10* (2013.01); *C08L 81/04* (2013.01); *C08L 85/02* (2013.01)

(58) Field of Classification Search
None
See application file for complete search history.

(56) References Cited

U.S. PATENT DOCUMENTS 6,340,739 B1 * 1/2002 Shigehara ............ C07D 309/38
549/291

FOREIGN PATENT DOCUMENTS

JP 2011-241158 A 12/2011

OTHER PUBLICATIONS

Hishida et al., "Polyesters of 2-Pyrone-4,6-dicarboxylic Acid (PDC) as Bio-based Plastics Exhibiting Strong Adhering Properties", Polymer Journal, 2009, vol. 41, No. 4, pp. 297-302.
Lefebvre et al., "Main chain polyamide rotaxanes from aliphatic crown ethers", Polymer, 2016, pp. 317-330.
Michinobu et al., "Polyesters of 2-Pyrone-4,6-Dicarboxylic Acid (PDC) Obtained from a Metabolic Intermediate of Lignin", Polymer Journal, 2008, vol. 40, No. 1, pp. 68-75.
Michinobu et al., "Fusible, Elastic, and Biodegradable Polyesters of 2-Pyrone-4,6-Dicarboxylic Acid (PDC)", Polymer Journal, 2009, vol. 41, No. 12, pp. 1111-1116.
Michinobu et al., "Synthesis and Characterization of Hybrid Biopolymers of L-lactic Acid and 2-Pyrone-4,6-dicarboxylic Acid", Journal of Macromolecular Science, Part A: Pure and Applied Chemistry, 2010, vol. 47, p. 564-570.
Michinobu et al.,"Click synthesis and adhesive properties of novel biomass-based polymers from lignin-derived stable metabolic intermediate", Polymer Journal, 2011, vol. 43, pp. 648-653.
Shikinaka et al., "Thermoplastic polyesters of 2-Pyrone-4, 6-Dicarboxylic Acid (PDC) obtained from a metabolic intermediate of Lignin", Sen'i Gakkaishi, 2013, vol. 69, No. 2, pp. 39-47.

* cited by examiner

*Primary Examiner* — Brieann R Johnston
(74) *Attorney, Agent, or Firm* — Michael A. McIntyre

(57) ABSTRACT

The present disclosure relates to a composition that includes a first repeat unit that includes

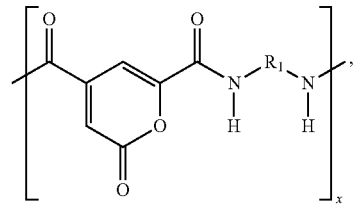

where x is between 1 and 1,000, inclusively, and $R_1$ includes at least one of a first hydrocarbon chain and/or a first hydrocarbon ring. In some embodiments of the present disclosure, $R_1$ may further include at least one of an oxygen atom, a nitrogen atom, a sulfur atom, and/or a phosphorus atom.

5 Claims, 4 Drawing Sheets

BIODERIVED MONOMERS AS REPLACEMENTS IN PETROLEUM BASED POLYMERS AND COPOLYMERS

CROSS-REFERENCE TO RELATED APPLICATIONS

This application claims priority from U.S. Provisional Patent Application No. 62/805,494 filed Feb. 14, 2019, the disclosure of which is incorporated herein by reference in its entirety.

CONTRACTUAL ORIGIN

This invention was made with government support under Contract No. DE-AC36-08GO28308 awarded by the Department of Energy. The government has certain rights in the invention.

SUMMARY

An aspect of the present disclosure is a composition that includes a first repeat unit that includes

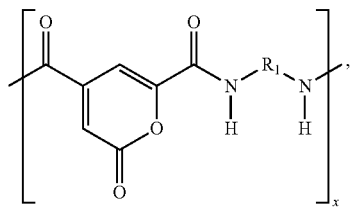

where x is between 1 and 1,000, inclusively, and $R_1$ includes at least one of a first hydrocarbon chain and/or a first hydrocarbon ring. In some embodiments of the present disclosure, $R_1$ may further include at least one of an oxygen atom, a nitrogen atom, a sulfur atom, and/or a phosphorus atom. In some embodiments of the present disclosure, $R_1$ may further include at least one of a hydroxyl group, an amine group, a carboxylic acid group, and/or a halogen. In some embodiments of the present disclosure, x may be between 10 and 500, inclusively. In some embodiments of the present disclosure, $R_1$ may include an aromatic ring having 5 carbon atoms.

In some embodiments of the present disclosure, the composition may have the structure defined by

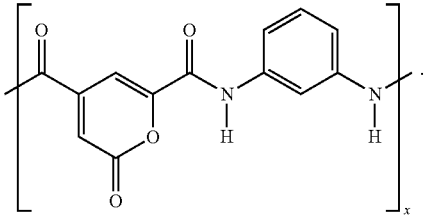

In some embodiments of the present disclosure, the composition may further include a second repeat unit that includes

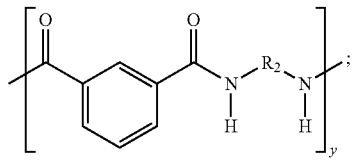

where y may be between 1 and 1000, inclusively, and $R_2$ may include at least one of a second hydrocarbon chain and/or a second hydrocarbon ring. In some embodiments of the present disclosure, $R_2$ may further include at least one of an oxygen atom, a nitrogen atom, a sulfur atom, and/or a phosphorus atom. In some embodiments of the present disclosure, $R_2$ may further include at least one of a hydroxyl group, an amine group, a carboxylic acid group, and/or a halogen. In some embodiments of the present disclosure, $R_2$ may include an aromatic ring having 5 carbon atoms. In some embodiments of the present disclosure, y may be between 10 and 500, inclusively.

In some embodiments of the present disclosure, the composition may have the structure

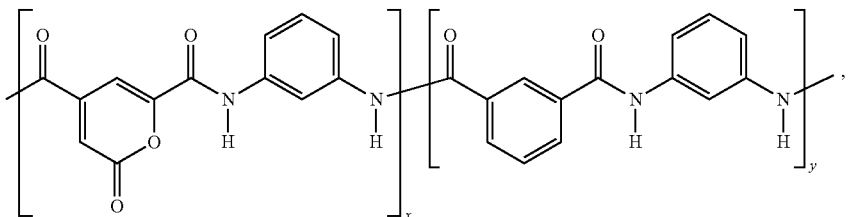

and the ratio of x toy (x:y) may be between about 50:1 and 1:50. In some embodiments of the present disclosure, the composition may further include a molecular weight between 5,000 and 75,000. In some embodiments of the present disclosure, the composition may further include a glass transition temperature between 60° C. and 275° C. In some embodiments of the present disclosure, the composition may further include a melt temperature between 200° C. and 375° C.

An aspect of the present disclosure is a composition that includes at least one of

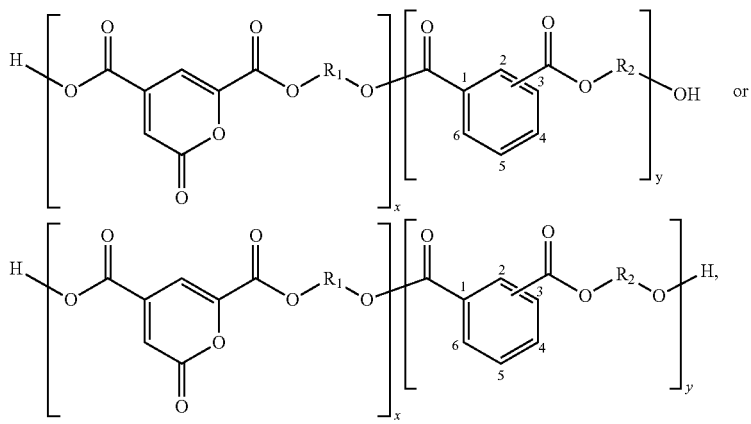

where a first repeat unit has a first number of repeat units, x, between 1 and 1,000, inclusively, a second repeat unit has a second number of repeat units, y, between 1 and 1,000, inclusively, $R_1$ includes a first saturated carbon chain having between 1 and 10 carbon atoms, $R_2$ includes a second saturated carbon chain having between 1 and 10 carbon atoms, the second repeat unit includes an aromatic ring and a chain including $R_2$ originating at either the third carbon atom or the fourth carbon atom of the aromatic ring.

An aspect of the present disclosure is a composition that includes at least two repeat units selected from the group of

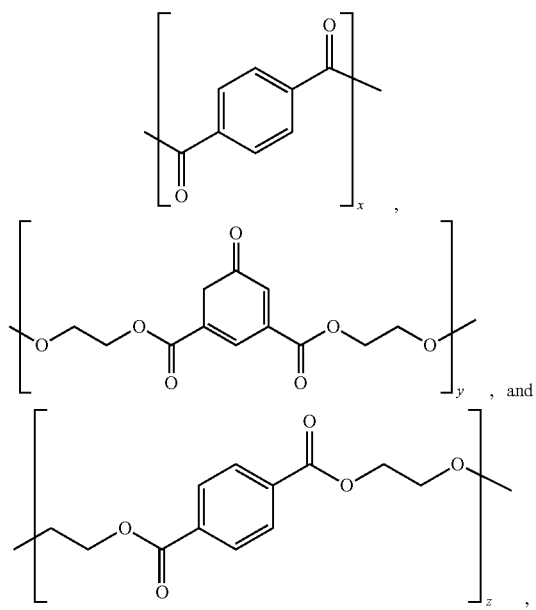

where x is between 1 and 1,000, inclusively, y is between 1 and 1,000, inclusively, and z is between 1 and 1,000, inclusively. In some embodiments of the present disclosure, the composition may further include a molecular weight between 1,000 and 10,000. In some embodiments of the present disclosure, the composition may further include a glass transition temperature between 25° C. and 90° C. In some embodiments of the present disclosure, the composition may further include a melt temperature between 150° C. and 250° C.

BRIEF DESCRIPTION OF THE DRAWINGS

Some embodiments are illustrated in referenced figures of the drawings. It is intended that the embodiments and figures disclosed herein are to be considered illustrative rather than limiting.

DETAILED DESCRIPTION

Figure 1:
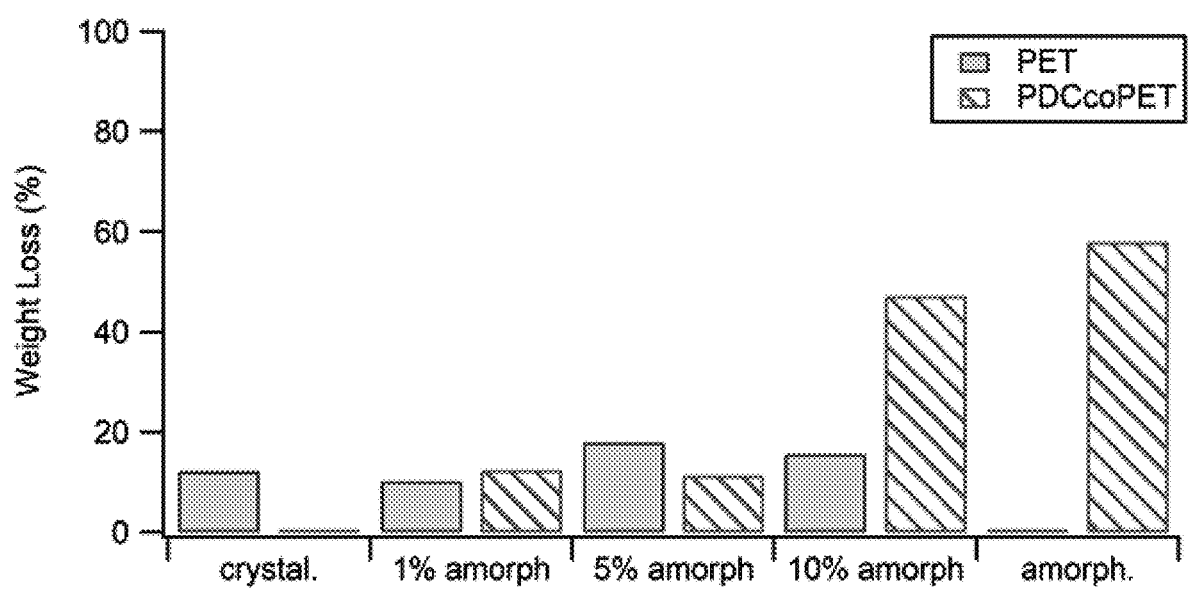
FIG. 1 illustrates acid hydrolysis data of various molar amounts of 2-pryone-4,6-dicarboxylic acid (PDC) incorporated into polyethylene terephthalate (PET) polymers, according to some embodiments of the present disclosure.

The embodiments described herein should not necessarily be construed as limited to addressing any of the particular problems or deficiencies discussed herein. References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to the use of bioderived monomers as replacement monomers in existing, typically petroleum derived polymers and/or copolymers. In other cases, bioderived monomers may be used to replace a portion of an original monomer to produce a novel polymer and/or copolymer that is constructed at least partially of bioderived materials and having unique physical and/or performance properties that are superior to the original material. In some embodiments of the present disclosure, bioderived 2-pryone-4,6-dicarboxylic acid (PDC) may replace isophthalic acid (IPA) in copolymers such as polyethylene terephthalate (PET) and Nomex®. The structures of PDC (Structure 1), Nomex® (Structure 2), and PET (Structure 3) are shown below. As described in more detail below, in some embodiments of the present disclosure, PDC may be reacted with at least one of 1,3-phenyldiamine (PDA) and/or isophthalic acid (IPA) to produce novel copolymers. The structures of PDA and IPA are shown below (see Structure 4 and Structure 5, respectively).

Structure 1

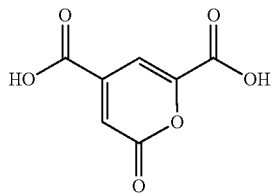

Structure 2

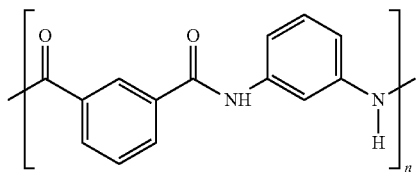

Structure 3

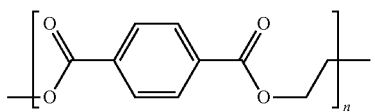

Structure 4

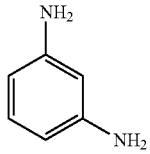

Structure 5

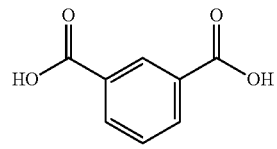

In some embodiments of the present disclosure, PDC may be obtained by the biological conversion of a lignin waste stream; e.g. in fermentation processes utilizing microorganisms capable of metabolizing lignin and/or lignin deconstruction products. Suitable microorganisms include bacteria, fungi, and/or yeast. An example of a suitable bacteria is a strain from the genus *Pseudomonas*. The bioderivation of replacement monomers from biomass, e.g. lignin waste streams, addresses the need to replace petroleum-derived materials. In addition, current technologies do not address the end-of-life for plastics. In some embodiments of the present disclosure, this deficiency in existing petroleum-based polymers and copolymers is addressed by the incorporation of a sacrificial comonomer, for example a lactone, as a functional replacement into existing petroleum-based materials and/or bioderived materials, which enables their biodegradation while still maintaining their thermal and structural properties.

Thus, some embodiments of the present disclosure relate to the use of PDC to at least partially replace petroleum-derived monomers in polymers and/or copolymers such as PET and Nomex®. For example, Reaction 1 illustrates a novel copolymer resulting from the copolymerization of PDA with PDC and IPA, where the copolymer is similar in structure and properties to Nomex®, and is at least partially bioderived.

Reaction 1

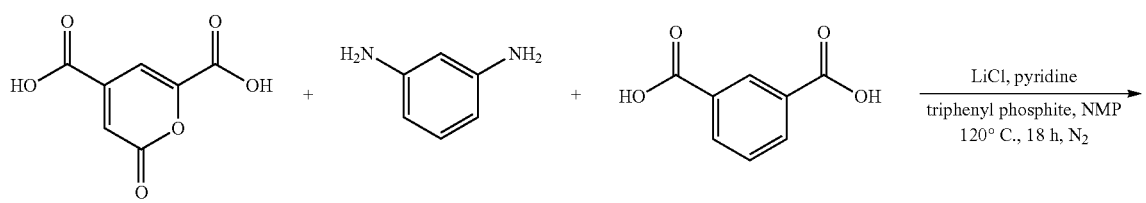

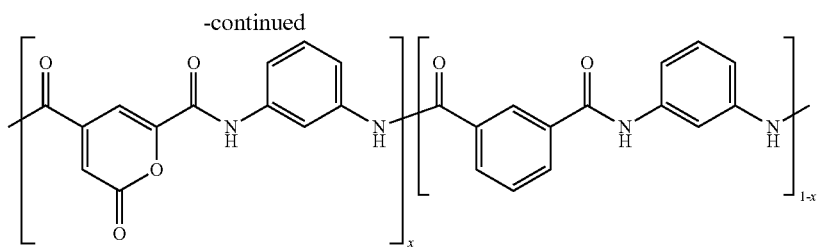

Reaction 2 shown below, illustrates the structure resulting from reacting PDC with PDA:

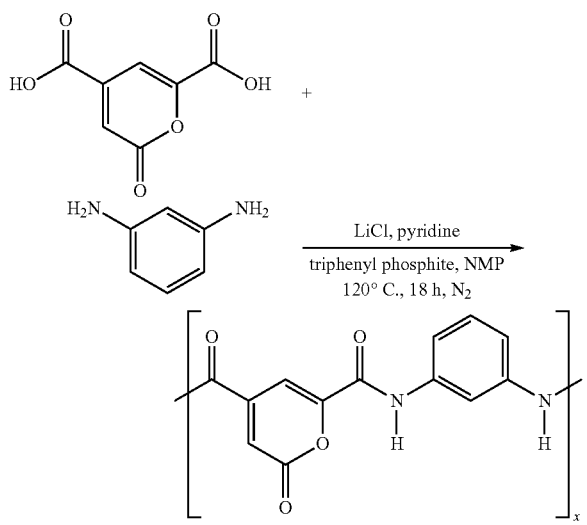

Although Reactions 1 and 2 show the reactions occurring at 120° C., in some embodiments of the present disclosure either of Reactions 1 and 2 may be performed at a temperature between about room temperature and about 200° C. In some embodiments of the present disclosure, either of Reactions 1 and 2 may be performed for a period of time between about 30 minutes and about 24 hours.

The general reaction conditions for Reactions 1 and 2 are shown above. Details can be found in (H. Lefebvre et al. *Polymer*, 2016, 90, 317-330). In brief, two or more of the monomers (PDA with PDC and/or PDC and IPA) in various mole percentages, triphenyl phosphite, pyridine, and lithium chloride were dissolved in 1-methyl-2-pyrrolidinone (NMP) under an inert atmosphere from concentrations ranging between 0.1 M to 1 M. The triphenyl phosphite forms reactive complexes with the pyridine in solution that interacts with either the carboxylic acid or amine to further form acyloxy phosphite or phosphoramide complexes. These combine and propagate to form the polyamides. The lithium chloride or lithium bromide with NMP was used to improve solubility of forming polymer. Alternative polar solvents can be used such as dimethyl sulfoxide (DMSO) or dimethyl formamide (DMF). The reaction was heated to 120° C. in a glass round bottom flask and stirred vigorously with a Teflon coated stir bar for 18 hours. The reaction was cooled to room temperature and reprecipitated into deionized water, and methanol. A light-yellow solid polymer was collected and vacuum dried overnight. Table 1 below summarizes glass-transition temperatures ($T_g$) and melting point temperatures ($T_m$) measured for five different copolymers, using various combinations of starting monomers: PDC, IPA, and PDA.

The numbers in the component columns of Table 1 indicate the molar percent of each monomer used. All temperatures are in Celsius.

TABLE 1

| Alternative Copolymers to Nomex ® | | | | | |
|---|---|---|---|---|---|
| PDC | IPA | PDA | $T_g$ | $T_m$ | $M_n$ |
| 50 | 0 | 50 | 225 | 345 | 60,000 |
| 10 | 40 | 50 | 115 | 285 | 14,000 |
| 5 | 45 | 50 | 85 | 277 | 20,000 |
| 1 | 49 | 50 | 105 | 220 | 20,000 |
| 0 | 50 | 50 | 265 | 350 | 25,000 |

In some embodiments of the present disclosure, copolymers having structures like any of those illustrated in Reactions 1 and 2 above may have a molecular weight between 5,000 and 75,000. As used herein, molecular weight is defined as the monomer molecular weight multiplied by the number of repeat units. In some embodiments of the present disclosure, the number of repeat units may be between 10 to 500. In some embodiments of the present disclosure, the copolymers made from the methods described herein may be randomly distributed along individual polymer chains.

Thus, as shown in Reaction 3 below, any diamine and/or aromatic diamine, may be reacted with PDC to produce novel polymers. R may be at least one of a straight hydrocarbon chain, branched hydrocarbon chain, and/or a hydrocarbon ring, where any of these structures may be saturated, unsaturated, and/or partially saturated. In addition, in some embodiments of the present disclosure, R may also comprise at least one of oxygen, nitrogen, sulfur, and/or phosphorus. In some embodiments of the present disclosure, R may include a hydroxyl group, an amine group, a carboxylic acid group, a halogen, and/or any other suitable functional group.

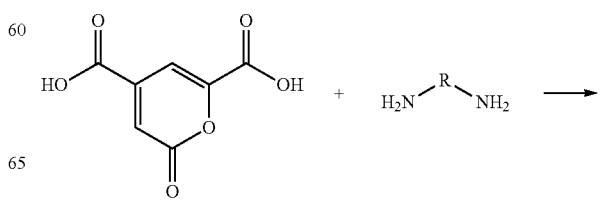

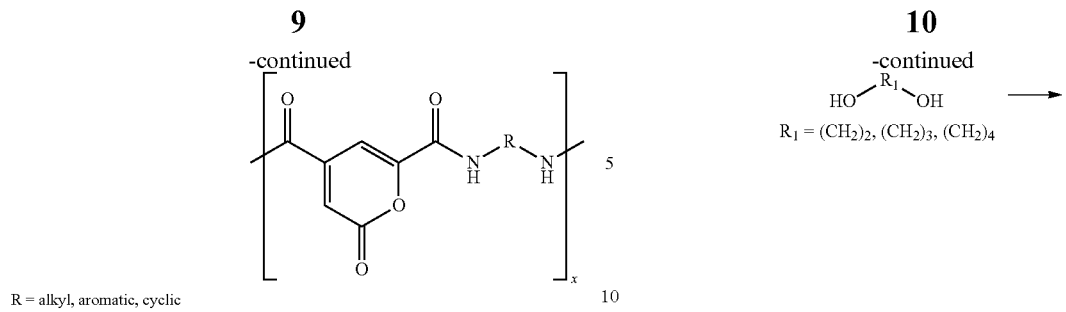

R = alkyl, aromatic, cyclic

In addition, some embodiments of the present disclosure relate to the use of bioderived monomers such as PDC, to produce PDC-PET copolymers. In some embodiments of the present disclosure, PDC may be reacted with a diol by condensation of hydroxyl groups to produce what is referred to herein as an xPDC, where x refers to the number of —CH$_2$— groups in an R$_1$ group, as summarized in Reaction 4 below. In some embodiments of the present disclosure, $1<x\leq 10$, or $1<x\leq 5$.

Reaction 4

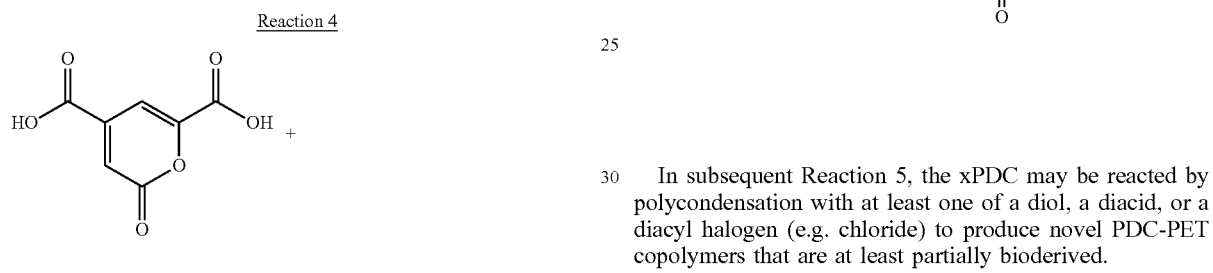

In subsequent Reaction 5, the xPDC may be reacted by polycondensation with at least one of a diol, a diacid, or a diacyl halogen (e.g. chloride) to produce novel PDC-PET copolymers that are at least partially bioderived.

Reaction 5

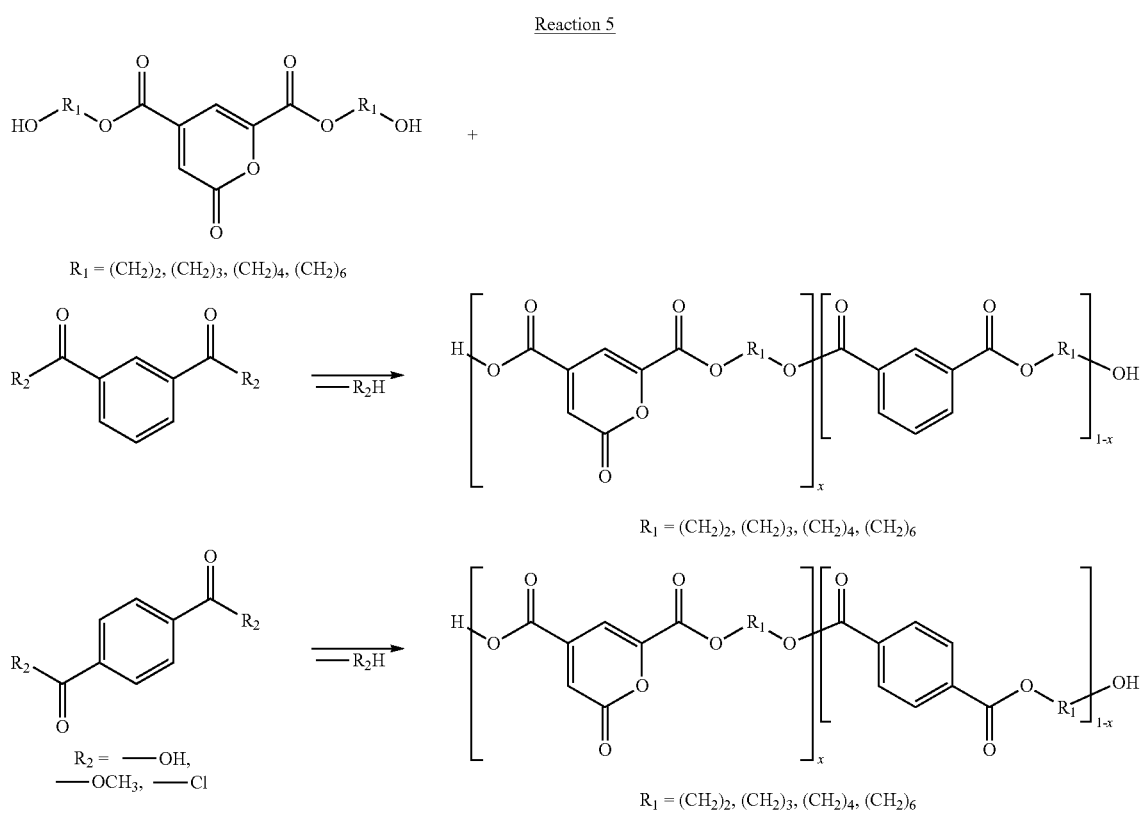

Table 2 below summarizes glass-transition temperatures ($T_g$) and melting point temperatures ($T_m$) measured for five different copolymers, using various combinations of three starting monomers: terephthalate acid (TPA), bis(2-hydroxyethyl)terephthalate (BHET), and ethyl-2-pryone-4,6-dicarboxylic acid (ePDC=xPDC where x equals 2). The structures of TPA (Structure 8), BHET (Structure 6), and ePDC (Structure 7), as well as a copolymer resulting from the copolymerization of TPA and ePDC (Structure 9—PDC-coPET), are shown below.

Table 3 illustrates the glass transition temperature and molecular weight of various copolymers, according to some embodiments of the present disclosure. Each copolymer was made from a mixture of 50 wt % PDC with the remainder being either 1,3-propanediol (PTT), 1,4-butanediol (BET), or 1-6-hexanediol (HET). Each copolymer produced was completely amorphous. In Table 3: PTT—poly(propylene terephthalate); PBET—poly(butylene terephthalate); and PHET—poly(hexylene terephthalate).

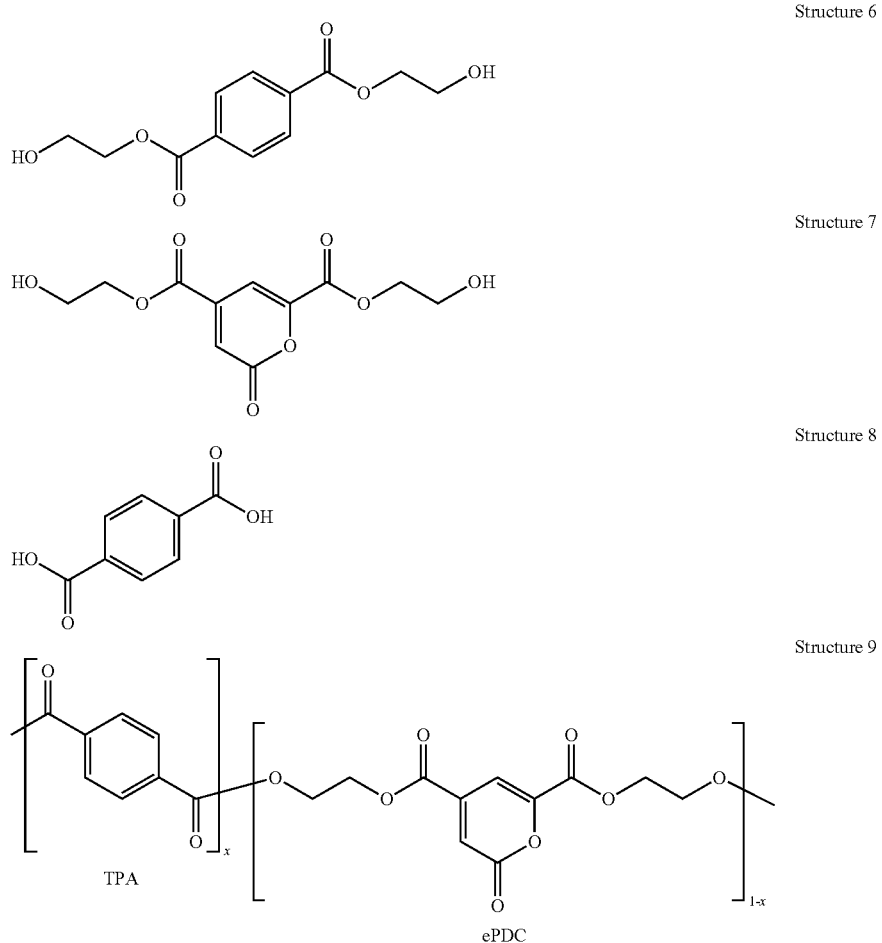

Structure 6

Structure 7

Structure 8

Structure 9

The numbers in the component columns indicate the molar percent of each monomer used. All temperatures are in Celsius.

TABLE 2

Alternative Copolymers to PDCcoPET

| ePDC | BHET | TPA | $T_g$ | $T_m$ | $M_n$ |
| --- | --- | --- | --- | --- | --- |
| 50 | 0 | 50 | 84 | — | 4000 |
| 10 | 40 | 50 | 75 | 160 | 3000 |
| 5 | 45 | 50 | 78 | 218 | 3000 |
| 1 | 49 | 50 | 76 | 220 | 3000 |

TABLE 3

Alternative Copolymers to PET

| Polymer | $T_g$ (° C.) | $M_w$ |
| --- | --- | --- |
| PDC-co-PTT | 48 | 3000 |
| PDC-co-PBET | 48 | 3000 |
| PDC-co-PHET | 25 | 3000 |

In some embodiments of the present disclosure, copolymers having structure like Structure 9 may have molecular weights reached up to 40,000 or 30,000. In some embodiments of the present disclosure, their molecular weights may be between 1,000 and up to 10,000. In some embodiments of the present disclosure, polymer having a structure like that of Structure 9 may be synthesized using melt polymerization procedures for a polycondensation step growth polymer. For example, the monomers may be melted at a temperature between about 120° C. and about 140° C. Subsequently, Sb$_2$O$_3$ (or another polycondensation catalyst; at about 3 wt % with a general range between about 0.1 wt % and about 5 wt %) and/or another chain extension reagent (titanium butoxide, bis-heterocyclic compounds, phthalimides, etc.) may be added and further polymerized at a temperature between about 180° C. and about 260° C. for about 4 hours. In some embodiments of the present disclosure, the resultant polymers may have a random incorporation along the polymer chain. As described above, any diamine, aromatic amine, may be reacted with at least one of PDC, IPA, and or TPA to produce novel polymers and/or copolymers, using the method shown above for Reaction 1. These reactions may be performed at a temperature from about room temperature to about 200° C. A subsequent method of obtaining a structure such as Structure 9 can been achieved through melt polymerization of PDC-PET short chain polymers with reclaimed waste PET and a catalyst. In some embodiments of the present disclosure, such a polymerization may generally be achieved by melting reclaimed PET at approximately 265° C. (with a general range between 260° C. and 300° C.) with the PDC-PET polymer with additional catalyst present (Sb$_2$O$_3$, Ti(OBu)$_4$, etc.) for roughly 12 hours (with a range between about 4 hours and 24 hours). The resulting polymers have PDC-PET short chains (molecular weights ranging from 1 kDa to 10 kDa) incorporated throughout the existing PET chains (molecular weights ranging from 25 kDa to 100 kDA).

FIGS. 1-4 illustrate degradation data for Structure 9 PDC-PET copolymer (PDCcoPET) (50 mol % PDC, called "amorph" due to the completely amorphous nature of the polymer) against a petroleum standard (PET) in a variety of solutions demonstrating degradation of the material. Below, the initial weights of the polymer were recorded, and 30 mL of each solution were added to the respective materials. The degradation studies were stirred at 100 rpm over 30 days at 60 degrees Celsius unless otherwise noted. The final solution was filtered and weighed to gain a percent weight loss represented on the y-axis. The x-axis are the molar percentages of PDC or isophthalic acid used to create comparable samples for degradation. The figures each compile the results of various molar ratio amorphous or crystalline PET samples under four separate hydrolysis conditions: acidic, basic, neutral water, and saltwater. From these figures, the degradation of PDC-co-PET compared to the petroleum standard was increased upon the addition of the lactone unit from the PDC in the copolymer chain across each of the four hydrolysis conditions.

The following applies to each of FIG. 1-4, described in more detail below. "Crystal." represents an entirely crystalline PET polymer (i.e. no isophthalic acid), while this is not a possible sample for the PDC polymers due to the meta-functionality of the carboxylic acids. "Amorph." represents an entirely amorphous polymer (i.e. no terephthalic acid), which has not been determined with a PET sample due to the nature of the material. 1% amorph represents 1 mole percent of PDC/isophthalic acid incorporated into a poly(ethylene terephthalate) polymer, and so forth for the 5 percent and 10 percent columns.

Figure 2:
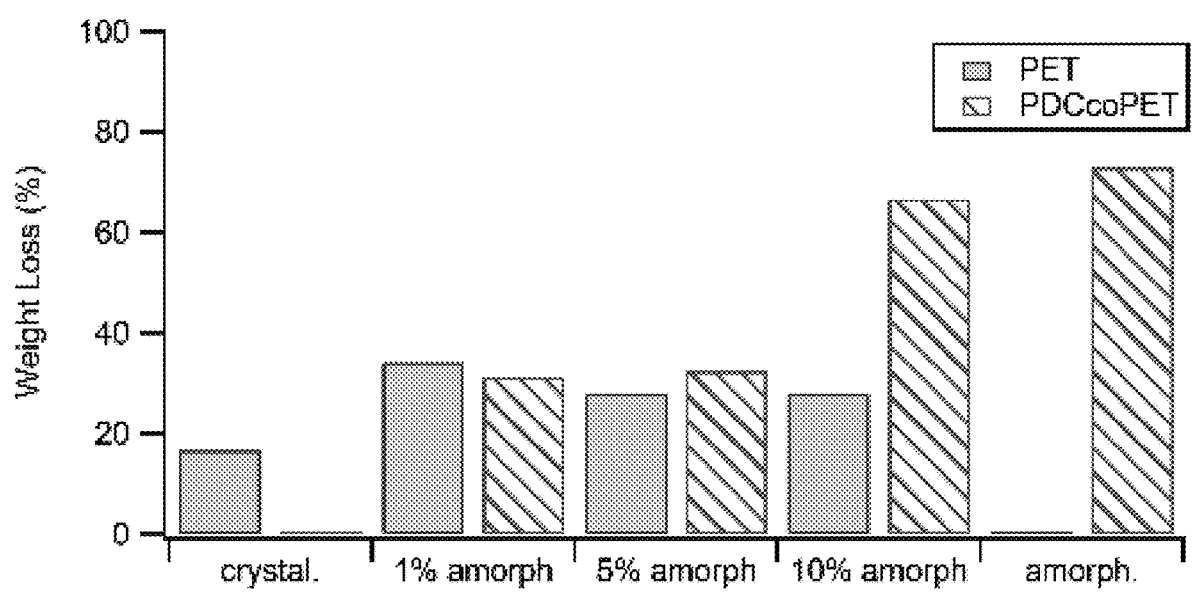
FIG. 2 illustrates base hydrolysis data of various molar amounts of PDC incorporated into PET polymers, according to some embodiments of the present disclosure.
Figure 3:
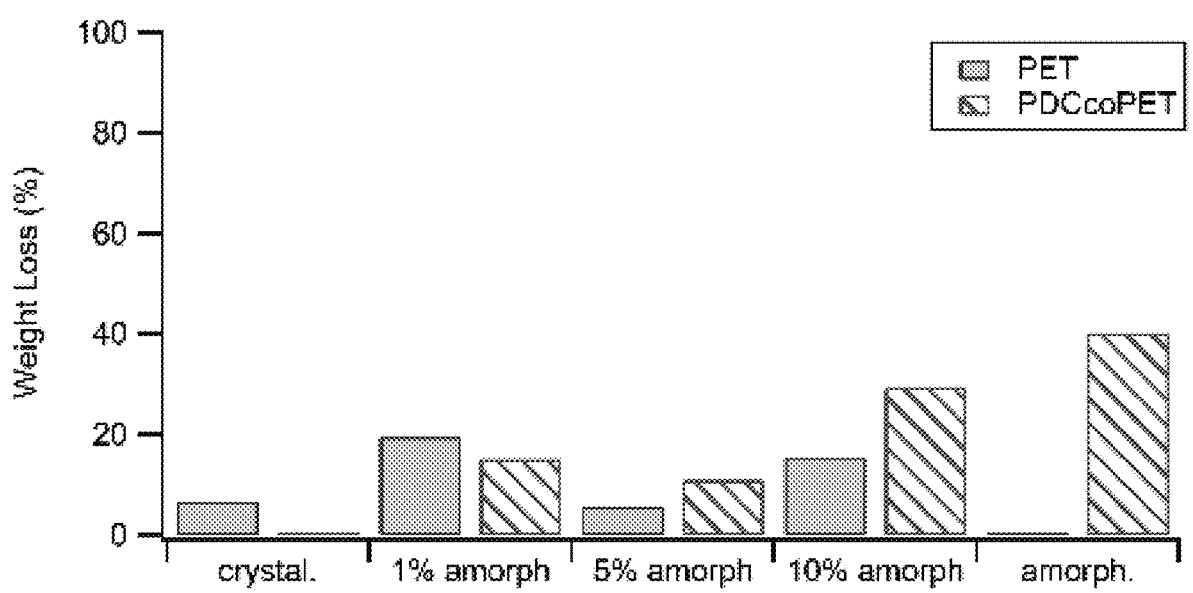
FIG. 3 illustrates saltwater hydrolysis data of various molar amounts of PDC incorporated into PET polymers, according to some embodiments of the present disclosure.
Figure 4:
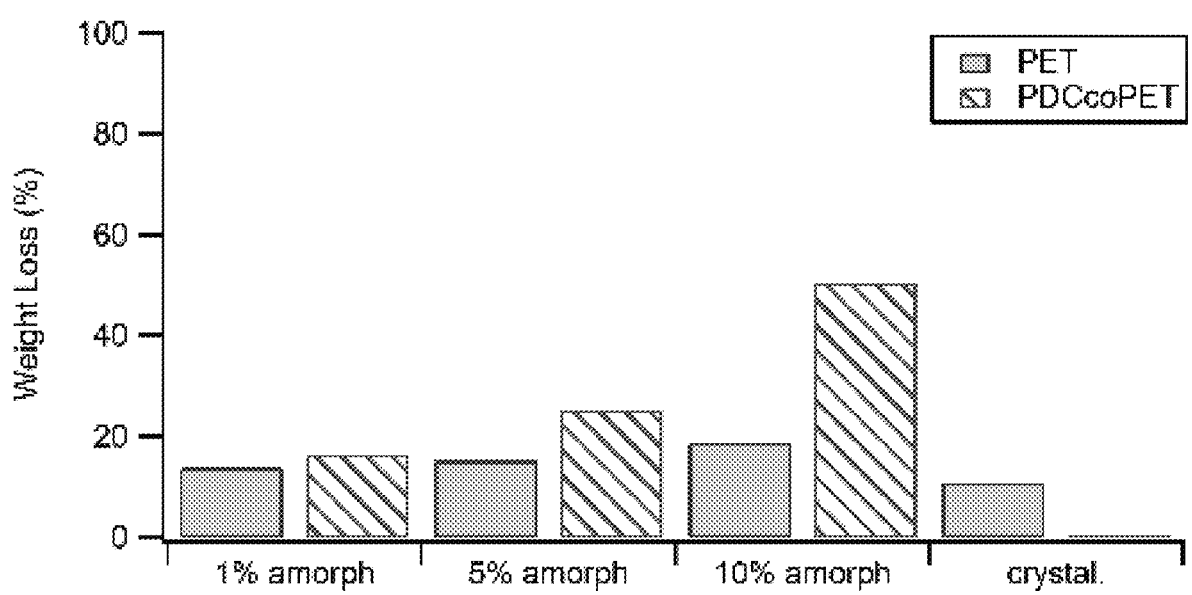
FIG. 4 illustrates neutral water hydrolysis data of various molar amounts of PDC incorporated into PET polymers, according to some embodiments of the present disclosure.

FIG. 1 illustrates results from accelerated degradation studies of PDCcoPET and PET polymers with similar amounts of amorphous monomer incorporated, when exposed to 0.01 M H2SO$_4$. FIG. 1 clearly shows a trend that with increasing amounts of PDC incorporated into the overall polymer, the higher weight loss obtained by acid hydrolysis. This creates for a material that will degrade in acidic conditions over time. FIG. 2 illustrates results from accelerated degradation studies of PDCcoPET and PET polymers with similar amounts of amorphous monomer incorporated, when exposed to 0.01 M NaOH. FIG. 2 clearly shows a trend that with increasing amounts of PDC incorporated into the overall polymer, the higher weight loss obtained by base hydrolysis. This creates for a material that will degrade in basic conditions over time. FIG. 3 illustrates results from accelerated degradation studies of PDCcoPET and PET polymers with similar amounts of amorphous monomer incorporated, when exposed to saltwater. FIG. 3 clearly shows a trend that with increasing amounts of PDC incorporated into the overall polymer, the higher weight loss obtained by saltwater hydrolysis. This creates for a material that will degrade in saltwater conditions over time. FIG. 4 illustrates results from accelerated degradation studies of PDCcoPET and PET polymers with similar amounts of amorphous monomer incorporated, when exposed to neutral water. FIG. 4 clearly shows a trend that with increasing amounts of PDC incorporated into the overall polymer, the higher weight loss obtained by water hydrolysis. This creates for a material that will degrade in aqueous conditions over time.

Whether or not a reactant or product described herein is "bioderived" may be determined by analytical methods. Using radiocarbon and isotope ratio mass spectrometry analysis, the bio-based content of materials can be determined. ASTM International, formally known as the American Society for Testing and Materials, has established a standard method for assessing the biobased content of carbon-containing materials. The ASTM method is designated ASTM-D6866. The application of ASTM-D6866 to derive a "biobased content" is built on the same concepts as radiocarbon dating, but without use of the age equations. The analysis is performed by deriving a ratio of the amount of radiocarbon (14C) in an unknown sample to that of a modern reference standard. The ratio is reported as a percentage with the units "pMC" (percent modern carbon). If the material being analyzed is a mixture of present-day radiocarbon and fossil carbon (containing no radiocarbon), then the pNMC value obtained correlates directly to the amount of biomass material present in the sample. Thus, ASTM-D866 may be used to validate that the compositions described herein are and/or are not derived from renewable sources.

EXAMPLES

Example 1

A composition comprising: a first repeat unit comprising

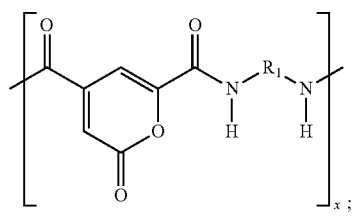

wherein: x is between 1 and 1,000, inclusively, and R$_1$ comprises at least one of a first hydrocarbon chain or a first hydrocarbon ring.

Example 2

The composition of Example 1, wherein the first hydrocarbon chain has between 1 and 10 carbon atoms.

Example 3

The composition of Example 1, wherein the first hydrocarbon ring has between 1 and 10 carbon atoms.

Example 4

The composition of Example 1, wherein $R_1$ further comprises at least one of an oxygen atom, a nitrogen atom, a sulfur atom, or a phosphorus atom.

Example 5

The composition of Example 1, wherein $R_1$ further comprises at least one of a hydroxyl group, an amine group, a carboxylic acid group, or a halogen.

Example 6

The composition of Example 1, wherein x is between 10 and 500, inclusively.

Example 7

The composition of Example 1, wherein $R_1$ comprises an aromatic ring having 5 carbon atoms.

Example 8

The composition of Example 7, wherein the composition has the structure defined by

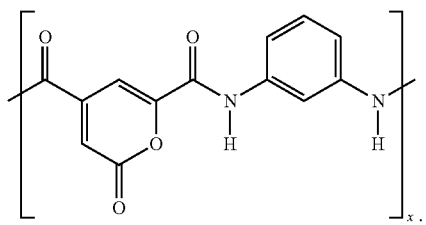

Example 9

The composition of Example 1, further comprising: a second repeat unit comprising

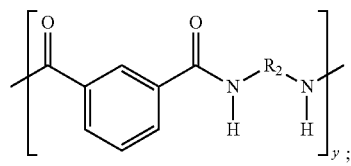

wherein: y is between 1 and 1000, inclusively, and $R_2$ comprises at least one of a second hydrocarbon chain or a second hydrocarbon ring.

Example 10

The composition of Example 9, wherein the second hydrocarbon chain has between 1 and 10 carbon atoms.

Example 11

The composition of Example 9, wherein the second hydrocarbon ring has between 1 and 10 carbon atoms.

Example 12

The composition of Example 9, wherein $R_2$ further comprises at least one of an oxygen atom, a nitrogen atom, a sulfur atom, or a phosphorus atom.

Example 13

The composition of Example 9, wherein $R_2$ further comprises at least one of a hydroxyl group, an amine group, a carboxylic acid group, or a halogen.

Example 14

The composition of Example 9, wherein $R_2$ comprises an aromatic ring having 5 carbon atoms.

Example 15

The composition of Example 9, wherein y is between 10 and 500, inclusively.

Example 16

The composition of Example 9, wherein: the composition has the structure

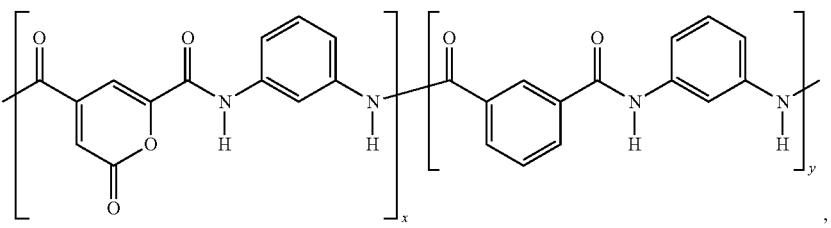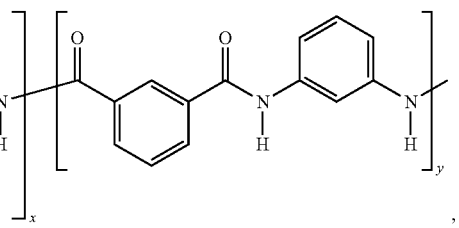

and the ratio of x to y (x:y) is between about 50:1 and 1:50.

Example 17

The composition of Example 16, further comprising a molecular weight between 5,000 and 75,000.

Example 18

The composition of Example 16, further comprising a glass transition temperature between 60° C. and 275° C.

Example 19

The composition of Example 16, further comprising a melt temperature between 200° C. and 375° C.

Example 20

A composition comprising: at least one of

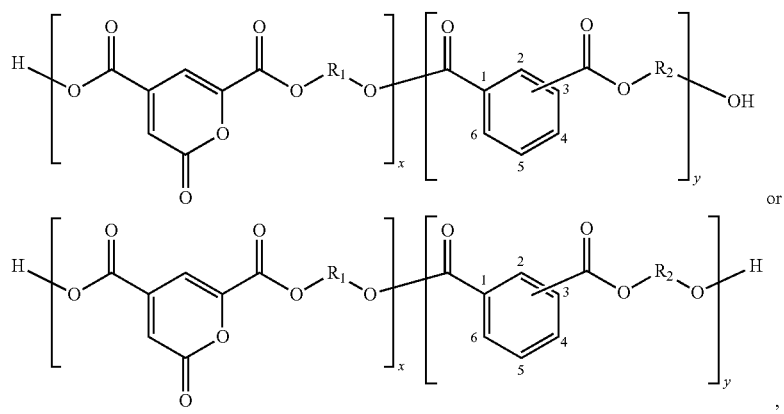

wherein: a first repeat unit has a first number of repeat units, x, between 1 and 1,000, inclusively, a second repeat unit has a second number of repeat units, y, between 1 and 1,000, inclusively, $R_1$ comprises a first saturated carbon chain having between 1 and 10 carbon atoms, $R_2$ comprises a second saturated carbon chain having between 1 and 10 carbon atoms, the second repeat unit includes an aromatic ring and a chain including $R_2$ originating at either the third carbon atom or the fourth carbon atom of the aromatic ring.

Example 21

The composition of Example 20, wherein $R_1$ is the same as $R_2$.

Example 22

The composition of Example 21, wherein $R_1$ is equal to two.

Example 23

A composition comprising: at least two repeat units selected from the group consisting of

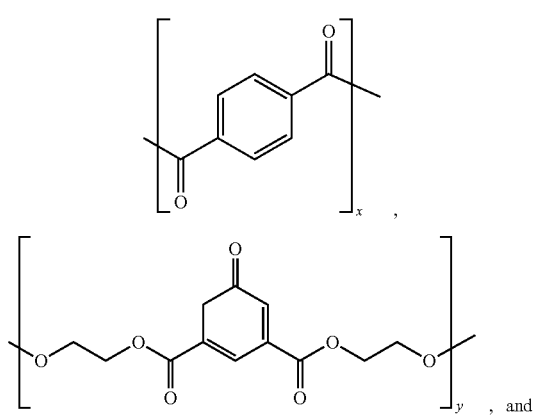

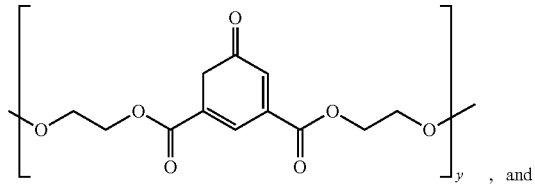

-continued

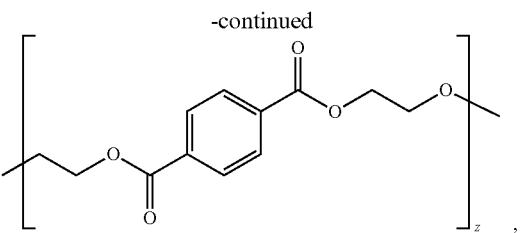

wherein: x is between 1 and 1,000, inclusively, y is between 1 and 1,000, inclusively, and z is between 1 and 1,000, inclusively.

Example 24

The composition of Example 23, further comprising a molecular weight between 1,000 and 10,000.

Example 25

The composition of Example 23, further comprising a glass transition temperature between 25° C. and 90° C.

Example 26

The composition of Example 23, further comprising a melt temperature between 150° C. and 250° C.

The foregoing discussion and examples have been presented for purposes of illustration and description. The

What is claimed is:

1. A composition comprising:

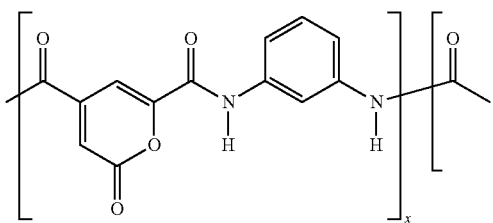

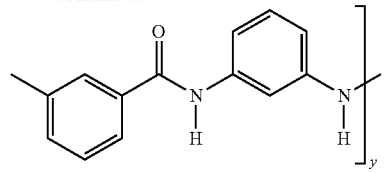

wherein:
x is between 1 and 1,000, inclusively,
y is between 1 and 1,000, inclusively, and
the molar ratio of x:y is between about 1:49 and about 10:40.

2. The composition of claim 1, wherein x is between 10 and 500, inclusively.

3. The composition of claim 1, further comprising a molecular weight between 14,000 and 20,000.

4. The composition of claim 1, further comprising a glass transition temperature between 85° C. and 115° C.

5. The composition of claim 1, further comprising a melt temperature between 220° C. and 285° C.

* * * * *